United States Patent [19]

Claus et al.

[11] Patent Number: 4,512,661
[45] Date of Patent: Apr. 23, 1985

[54] DUAL DIFFERENTIAL INTERFEROMETER

[75] Inventors: Richard O. Claus, Christianburg, Va.; Tyson M. Turner, Dallas, Tex.

[73] Assignee: The United States of America as represented by the Aministration of the National Aeronautics and Space Administration, Washington, D.C.

[21] Appl. No.: 414,237

[22] Filed: Sep. 2, 1982

[51] Int. Cl.³ .............................................. G01B 9/02
[52] U.S. Cl. ...................................... 356/351; 73/657; 356/358
[58] Field of Search ............... 356/351, 357, 358, 359, 356/360, 239, 371, 376; 73/655, 657

[56] References Cited

U.S. PATENT DOCUMENTS 3,788,750  1/1974  Maltby, Jr. et al. ............... 356/239
4,126,392  11/1978  House ................................ 356/28.5
4,255,055  3/1981  Schave ........................... 356/239 X

OTHER PUBLICATIONS

Palmer, "Ultrasonic Surface Wave Detection by Optical Interferometry" *J. Acoust. Soc. Am.*, vol. 53, No. 3, pp. 948–949, 3/73.

Primary Examiner—Davis L. Willis
Assistant Examiner—Matthew W. Koren
Attorney, Agent, or Firm—William H. King; John R. Manning; Howard J. Osborn

[57] ABSTRACT

A dual two-beam differential interferometer that measures both the amplitude and orientation of propagating, broadband surface acoustic waves. Four beams are focused on a surface. The four reflected beams are separated into two pairs. The two pairs are detected to produce two signals that are used to compute amplitude and orientation.

5 Claims, 3 Drawing Figures

DUAL DIFFERENTIAL INTERFEROMETER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The invention relates generally to interferometers and more specifically concerns a dual differential interferometer that measures both the amplitude and orientation of propagating, broadband ultrasonic surface acoustic waves (SAW).

Two monochromatic laser beams interfere according to their relative phase. The interference pattern produced is an intensity distribution consisting of light and dark regions referred to as fringes. Since the phase transverses $2\pi$ radians in each wavelength, the relative phase for two beams derived from the same source can be considered as their relative pathlength difference. Points in the image plane with pathlength differences equal to integer multiples of wavelength constructively interfere. Half wavelength path differences destructively interfere. The changing of pathlength in time of one beam relative to the other causes a synchronous translation of the fringes. A displacement of one wavelength produces a shift of one fringe position in the interference pattern. If both beam paths change simultaneously by the same distance, there is no fringe translation. The motion of the fringes can be monitored by an optical detector.

For surface acoustic wave measurements, two monochromatic beams are focused on the surface of a specimen one-half the SAW wavelength apart. The reflections from the incident beams are then combined to form a fringe pattern and is called a differential interferometer. In the relaxed state, the fringe pattern will remain fixed. Fringe translations occur when a SAW generated on the specimen interacts with the incident beams. The interaction is due to the modulation of the specimen surface by the SAW on which the beams are reflected. This modulation varies in time the pathlengths of each beam. The incident beams placed one-half wavelength of the SAW apart have maximum differential pathlength modulation. If placed exactly a wavelength apart, the displacement in relative pathlength would be zero and no fringe shifts would occur. Also, a translation of the specimen would not produce fringe shifts.

The two beam differential interferometer has several limitations. The modulation of the focused spots is dependent not only on the amplitude of the SAW but also on the angular orientation of the SAW propagation with respect to a chord passing through the two spots. The detected amplitude of a SAW is thus the component of surface wave motion along the direction parallel to the chord. Accordingly, SAWs of unequal amplitude and different angular orientations may appear the same to the two-beam interferometer. In fact, a SAW propagating at a 90° incidence to the reference chord would ideally generate no detectable sign of its presence.

It is an object of this invention to provide an interferometer that measures both the amplitude and orientation of propagating, broadband SAWs.

Another object of this invention is to provide an interferometer for measuring the amplitude of propagating broadband SAWs without regard to the orientation of the propagating waves.

A further object of this invention is to provide means for increasing the sensitivity of optical detectors used in two-beam differential interferometers.

Other objects and advantages of this invention will become apparent hereinafter in the specification and drawings.

SUMMARY OF THE INVENTION

The four beams from two dual beam interferometers are focused on the SAWs to be measured in a crosshair configuration. That is, straight lines between each set of dual beams are perpendicular to each other. The reflected beams are separated into pairs and then detected to produce two signals. The two signals are processed to provide both the amplitude and orientation of propagation of the SAWs. Separation of the reflected beams is accomplished by polarizing one pair of dual beams differently from the other pair before they are focused on the SAWs. Then the two pairs of reflected beams are separated in accordance with their different polarizations.

DETAILED DESCRIPTION OF THE INVENTION

Figure 1:
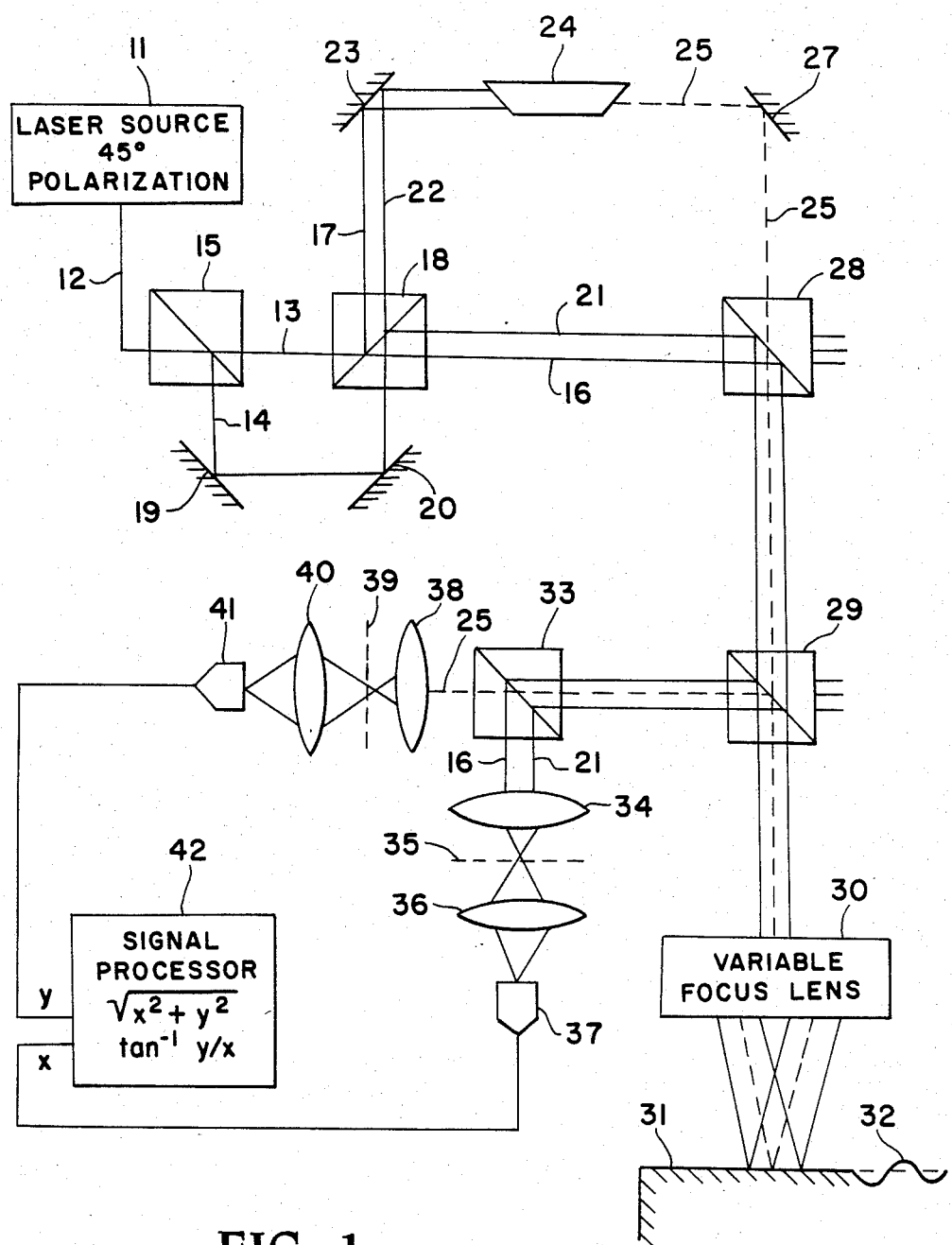
FIG. 1 is a block diagram of the invention.

Turning now to the embodiment of the invention selected for illustration in the drawings the number 11 in FIG. 1 designates a laser source with a forty-five degree polarization. The beam 12 from laser source 11 is split into equal intensity beams, 13 and 14, by a beamsplitter 15. Beam 13 is split into two equal intensity beams, 16 and 17, by a beamsplitter 18. Beam 14 is reflected by mirrors 19 and 20, and then split into two equal intensity beams 21 and 22, by beamsplitter 18. Beams 17 and 22 are reflected by a mirror 23 onto a dove prism 24 mounted at a forty-five degree angle to the horizontal. Prism 24 rotates beams 17 and 22 to a perpendicular orientation with respect to beams 16 and 21. The rotated beams 25 and 26 (26 is not shown because it is behind beam 25) are reflected by a mirror onto a polarizing beamsplitter 28. Beams 16 and 21 are also directed onto beamsplitter 28. Beamsplitter 28 polarizes beams 25 and 26 ninety degrees with respect to beams 16 and 21. In addition, all four beams are aligned in parallel and centered by beamsplitter 28.

Figure 2:
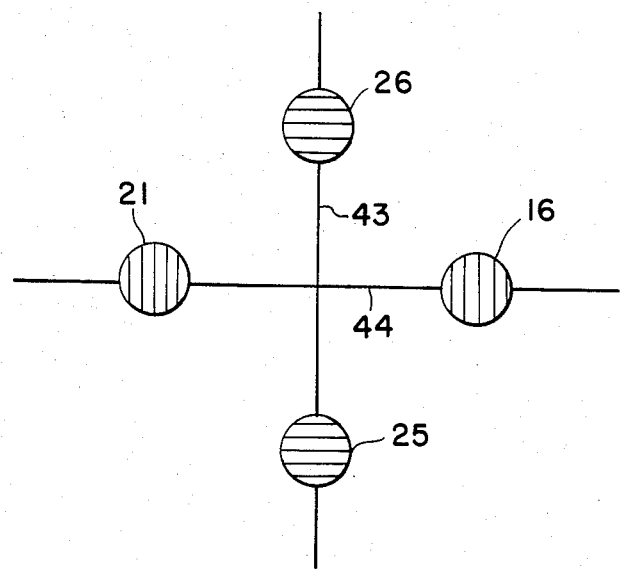
FIG. 2 is a diagram showing the positions of the beams focused on the SAWs.

The two pairs of beams from beamsplitter 28 pass through a beamsplitter 29 and a variable focus lens 30 to a surface 31 on which the surface acoustic waves 32 are to be measured. The orientation of the four beams focused on surface 31 is shown in FIG. 2. Beams 25 and 26 and beams 16 and 21 are one-half a wavelength of waves 32 apart. Alternatively, the beams could be $(n+\frac{1}{2})$, $n=0, 1, 2, 3, \ldots$ wavelengths apart from maximum sensitivity. An imaginary straight line 43 between the centers of beams 25 and 26, and an imaginary straight line 44 between the centers of beams 16 and 21 are perpendicular to each other.

Both interferometer beam pairs are expanded and refocused onto surface 31 by variable focus lens 30. With lens 30, the separation of the focused beam spots on the surface can be varied, However, beam spot separation is more easily manipulated by separation beam pairs appropriately when generated at the front of the system. This is accomplished by a translation of mirrors 20 and 27.

The beams reflected by surface 31 pass through lens 30 and beamsplitter 29 to a polarizing beamsplitter 33. Beamsplitter 33 separates reflected beams 25 and 26 from reflected beams 16 and 21. Reflected beams 16 and 21 pass through a lens 34, a Ronchi grating 35 and a lens 36 to a detector 37. Reflected beams 25 and 26 pass through a lens 38, a Ronchi grating 39 and a lens 40 to a detector 41. The signal X at the output of detector 37 is proportional to the motion of the SAWs 32 along line 44, and the signal y at the output of detector 41 is proportional to the motion of the SAWs 32 along line 43. The signals x and y are applied to a signal processor 42 which computes $\sqrt{x^2+y^2}$ (the amplitude of the SAWs 32) and computes $\tan^{-1} y/x$ (the orientation of propagation of SAWs 32). The angle $\tan^{-1} y/x$ is from line 44 in a clockwise direction. The signal processor 42 can utilize either analog or digital computing means.

The purpose of the Ronchi gratings 35 and 39 is to spatially filter the images of the fringes. The fringes are overlayed onto the grating with a quarter wave displacement. Consequently, the overall dc light intensity is halved and the modulation light by a fringe shift is effectively doubled over a system without spatial filtering.

The advantage of the invention is that it provides a dual two-beam interferometer which will measure both the amplitude and orientation of propagating, broadband SAWs.

Figure 3:
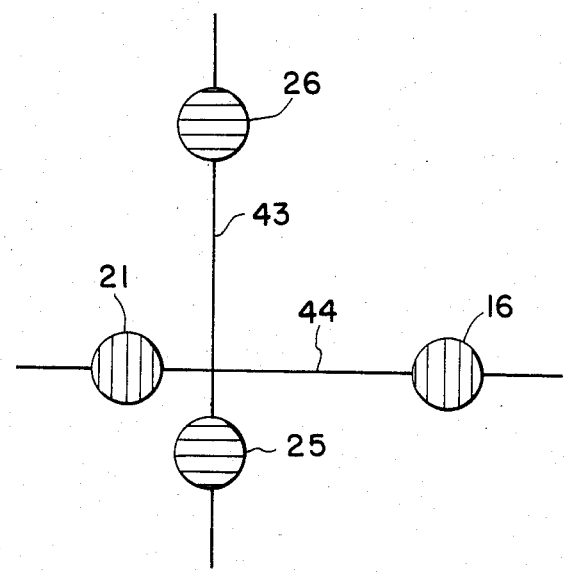
FIG. 3 is a diagram showing alternative positions of the beams focused on the SAWs.

The dual two-beam differential interferometer does not have any disadvantages in comparison to the signal interferometer. The dual interferometer does have limitations which are problems not rectified from the single system. One limitation is the inability to determine propagation direction. Angular orientation can be determined for all SAWs except those which are incident at forty-five degrees to both beam spot pairs. This problem can be alleviated by slightly reducing the separation between two orthogonally polarized spots creating a time differential between detection of one orientation with respect to the other as shown in FIG. 3.

Other limitations of interferometric systems which this system does not alleviate is the error associated with detected signals from SAW edge effects and high frequency attenuation. SAW edge effects can create an amplitude differential over a distance parallel to the wavefront causing erroneous signal generation. This would be particularly evident when the SAW wavefront is parallel incident to a spot pair. High frequency SAW attenuation is similar in its effects. Over a short distance the amplitude variation due to attenuation causes loss of signal modulation and therefore erroneous amplitude component computations.

Lastly, there is a detectable frequency limit of the system due to the physical spot size. The focused beam spot on the surface has physical dimensions the minimum of which is two times focal length of the focusing lens times the wavelength of light divided by the diameter of the focusing lens. For a realizable system, the spot size limit is approximately two times the wavelength of light. As the spot diameter approaches magnitudes of the SAW wavelength, the modulation becomes an averaging effect and the detected amplitude decreases. As the spot size equals the wavelengths, the averaging effect simulates zero modulation. Thus, the upper limit of detectable frequencies occurs when the SAW wavelength approaches the diameter of the focused interferometer beam on the surface.

What is claimed is:

1. A method for measuring both the amplitude and orientation of propagating, broadband ultrasonic surface waves comprising the steps of:
   producing two pairs of laser beams including the step of orthogonally polarizing one pair with respect to the other;
   focusing said two pairs of laser beams onto the ultrasonic surface waves to be measured such that the two beams in each pair of laser beams are one-half a wavelength of the ultrasonic surface waves apart and such that a straight line between the centers of the beams of one of said pairs of laser beams is perpendicular to a straight line between the centers of the other pair;
   separating the reflected pairs of laser beams comprising the step of separating the two pairs of reflected beams in accordance with their polarizations;
   detecting the separated pairs of laser beams to obtain two signals proportional to the surface wave motions along the two said straight lines; and
   processing said two signals to obtain amplitude and orientation of propagation of the surface waves.

2. A method according to claim 1 wherein said step of producing two pairs of laser beams and orthogonally polarizing one pair with respect to the other pair includes the steps of producing a single laser beam, producing two separate pairs of laser beams from said single laser beam, polarizing one of said separate pairs of laser beams 90° with respect to the other pair and then combining the two pairs of laser beams.

3. A method according to claim 2 wherein the step of producing a single laser beam comprises the step of producing a single laser beam that has a 45° polarization angle to the horizontal whereby each of said pairs of laser beams have a polarization angle of 45° to the horizontal.

4. Apparatus for measuring both the amplitude and orientation of propagating, broadband ultrasonic surface waves comprising:
   means for producing two pairs of light beams;
   means for focusing said two pairs of light beams onto the ultrasonic surface waves to be measured such that a straight line between the centers of the beams of one pair of said beams is perpendicular to a straight line between the centers of the other pair and such that the beams of each pair are $n+\frac{1}{2}$ wavelengths of the ultrasonic surface waves apart wherein n=0, 1, 2, 3 . . . ;
   means for separating the reflected beams into pairs including means for polarizing one pair of beams differently from the other pair before they are focused onto the surface waves and means for separating the beams in accordance with their different polarizations;
   means for detecting each pair of the separated beams to obtain two signals proportional to the surface wave motions along the two said straight lines; and
   means for processing said two signals to obtain amplitude and orientation of propagation of the surface waves.

5. Apparatus according to claim 4 wherein said means for separating the beams in accordance with their different polarizations is a polarizing beamsplitter.

* * * * *